(12) United States Patent
Lu et al.

(10) Patent No.: US 12,326,841 B1
(45) Date of Patent: Jun. 10, 2025

(54) BACKGROUND INCREMENTAL DELETION CLEANUP TECHNIQUES AT STORAGE SERVICES

(71) Applicant: Amazon Technologies, Inc., Seattle, WA (US)

(72) Inventors: Zhuzeng Lu, Mountain View, CA (US); Andrea Olgiati, Gilroy, CA (US); Terence Kelly, Redwood City, CA (US); Carlos Garcia-Alvarado, Gilroy, CA (US); Vikram Singh Bisht, Seattle, WA (US); Anurag Windlass Gupta, Atherton, CA (US); John Benjamin Tobler, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/604,616

(22) Filed: May 24, 2017

Related U.S. Application Data

(60) Provisional application No. 62/471,828, filed on Mar. 15, 2017.

(51) Int. Cl.
*G06F 16/215* (2019.01)
(52) U.S. Cl.
CPC .................................. *G06F 16/215* (2019.01)
(58) Field of Classification Search
CPC ...................................................... G06F 16/215
See application file for complete search history.

(56) References Cited

U.S. PATENT DOCUMENTS

| | | | | |
|---|---|---|---|---|
| 8,966,184 | B2 * | 2/2015 | Atkisson | G06F 12/0804 |
| | | | | 711/133 |
| 9,002,805 | B1 * | 4/2015 | Barber | G06F 16/215 |
| | | | | 707/692 |
| 2003/0154216 | A1 * | 8/2003 | Arnold | G06F 16/211 |
| 2008/0098083 | A1 * | 4/2008 | Shergill | G06F 16/215 |
| | | | | 709/217 |
| 2011/0219020 | A1 * | 9/2011 | Oks | G06F 16/221 |
| | | | | 707/769 |
| 2011/0258391 | A1 * | 10/2011 | Atkisson | G06F 11/108 |
| | | | | 711/E12.017 |
| 2012/0278589 | A1 * | 11/2012 | Yoshihara | G06F 13/385 |
| | | | | 712/30 |
| 2013/0046949 | A1 * | 2/2013 | Colgrove | G06F 3/064 |
| | | | | 711/170 |
| 2013/0185497 | A1 * | 7/2013 | Benhase | G06F 12/0833 |
| | | | | 711/105 |
| 2014/0046909 | A1 * | 2/2014 | Patiejunas | G06F 11/1076 |
| | | | | 707/687 |
| 2014/0064909 | A1 * | 3/2014 | Trivedi | F01D 11/001 |
| | | | | 415/1 |

(Continued)

*Primary Examiner* — Ann J Lo
*Assistant Examiner* — Fernando M Mari Valcarcel
(74) *Attorney, Agent, or Firm* — S. Scott Foster; Kowert, Hood, Munyon, Rankin & Goetzel, P.C.

(57) ABSTRACT

A determination is made as to whether a workload associated with a collection of data items satisfies a first condition. If the first condition is satisfied, a determination is made as to whether a metric of dirty records to which delete operations have been directed within a portion of a data item satisfies a second condition. If the second condition is also satisfied, a cleanup operation may be initiated so that data blocks storing the portion of the data item do not include the deleted record.

20 Claims, 9 Drawing Sheets

(56) References Cited

U.S. PATENT DOCUMENTS

| | | | |
|---|---|---|---|
| 2014/0281297 A1* | 9/2014 | Duluk, Jr. | G06F 13/4282 |
| | | | 711/159 |
| 2016/0077745 A1* | 3/2016 | Patel | G06F 12/0253 |
| | | | 714/704 |
| 2016/0092464 A1* | 3/2016 | Hildebrand | G06F 16/1805 |
| | | | 707/648 |
| 2016/0259571 A1* | 9/2016 | Kumasawa | G06F 3/0619 |
| 2016/0342529 A1* | 11/2016 | Liao | G06F 12/12 |
| 2016/0371145 A1* | 12/2016 | Akutsu | G06F 3/067 |

\* cited by examiner

BACKGROUND INCREMENTAL DELETION CLEANUP TECHNIQUES AT STORAGE SERVICES

This application claims benefit of priority of U.S. Provisional Application No. 62/471,828, filed Mar. 15, 2017, entitled "Background Incremental Deletion Cleanup Techniques At Storage Services," which is hereby incorporated by reference herein in its entirety.

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data organizations must store and manage often correspondingly increases both the size and complexity of data storage and management technologies, like database systems, which in turn raise the cost of maintaining the information. New technologies increasingly seek to reduce both the complexity and storage requirements of maintaining data while simultaneously improving the efficiency of data storage and data management.

Figure 1:
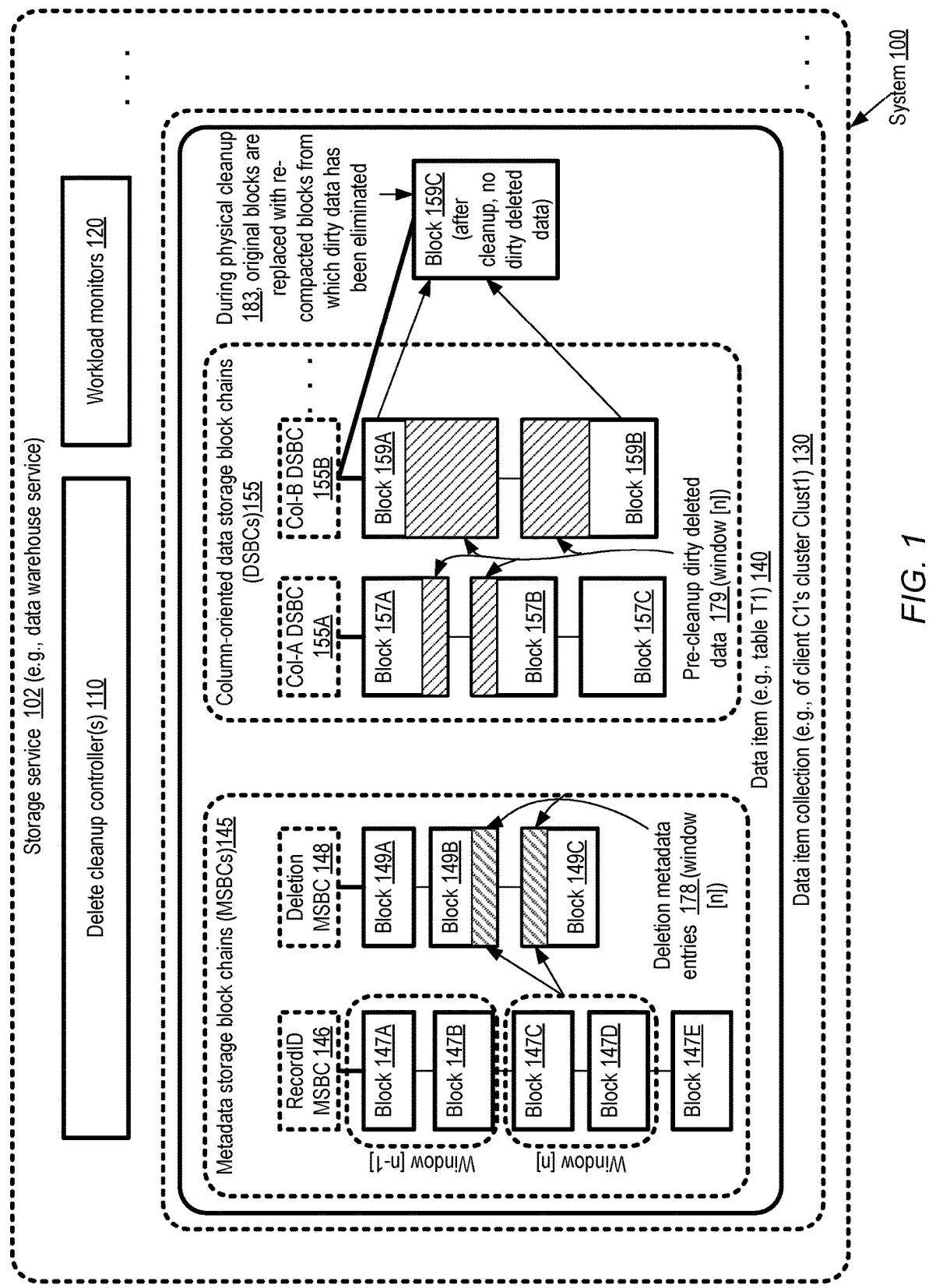
FIG. 1 illustrates an example system environment in which an incremental technique for cleaning deleted data of various data items of a data store with minimal impact on customer workloads may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Embodiments of methods and apparatus for low-overhead incremental deletion cleanup operations at data stores are described. In one embodiment, a network-accessible storage service such as a data warehousing service may be implemented, at which respective collections of data items such as tables may be stored on behalf of numerous clients, e.g., with individual tables comprising one or more records and individual records comprising values of one more columns. In at least some embodiments, a data store comprising a set of tables associated with a customer or client of such a service may be managed using a plurality of computing devices collectively referred to as a cluster. A cluster may store one or multiple databases, in some embodiments. In one embodiment, the contents of a given data item such as a table may be stored using one or more chains of storage blocks organized in a column-oriented fashion—e.g., if records of a table T1 comprise values for C columns, C chains of storage blocks may be set up such that the values of a given column are stored in a respective chain. In such an embodiment, an individual storage block may comprise some number of data bytes and a chain pointer which indicates an address of another storage block of the chain. In addition to the storage blocks which hold data contents of the table, the storage service may also utilize chained storage blocks to store one or more types of metadata in various embodiments as discussed below in further detail, including for example record identifiers and record addresses/locations of a table, deletion-related metadata, and so on. In at least one embodiment, a column-oriented storage architecture may not necessarily be employed-instead, for example, the contents of a data item may be stored as a sequence of complete records, with values for different columns of a given record stored consecutively in a given storage block.

In at least some embodiments, the storage service may implement one or more programmatic interfaces which can be used to request operations on the data stored in the clusters. For example, in one embodiment such interfaces may include a web-based console, a set of application programming interfaces (APIs), command-line tools, graphical user interfaces and the like. In some embodiments separate sets of programmatic interfaces may be implemented for administrative or control-plane operations (such as creating a cluster, changing access permissions on data items, and the like) and data-plane operations (such as reading or writing table contents). Data-plane requests which may be directed to a data object such as a table via programmatic interfaces may include, among others, creating the table, inserting one or more records, reading portions or all of one or more records, modifying one or more records, deleting one or more records, deleting the table, creating an index, deleting an index, and so on in various embodiments.

In some embodiments, when a request to delete a particular record is received at the storage service, a logical rather than a physical delete may initially be performed. That is, in such an embodiment, the targeted record may be marked for deletion, e.g., by storing a deletion metadata entry, but the content of the record may remain present temporarily in the data block or blocks which were being used for the record prior to the submission of the deletion request. Later, as part of a separate delete cleanup operation or procedure, the data of the record which was logically deleted may be physically deleted or overwritten in various embodiments. From the perspective of clients or users of the storage service, in at least some embodiments only a single type of delete operation may be supported, and the clients may not necessarily be aware of the staged processing of the delete into a logical delete followed eventually by a physical delete as part of a cleanup operation. One or more delete cleanup coordinators of the storage service may be responsible for orchestrating and scheduling such delete cleanup operations in at least some embodiments. In various embodiments, a delete cleanup coordinator may comprise portions of one or more computing devices and/or associated software components, as discussed below in further detail. In some embodiments, delete cleanup procedures may be performed in a distributed manner, with decisions regarding whether to initiate physical cleanup operations with respect to a given set of records being made at a different entity than the entity at which the physical cleanup operations for that set of records are eventually implemented.

According to at least some embodiments, delete cleanup operations may be performed, e.g., with respect to a given cluster, incrementally or iteratively, and only if certain conditions are met. In one such embodiment, during a given iteration of the delete cleanup procedure for a cluster, a determination may first be made as to whether the workload associated with the cluster satisfies a first condition or threshold. For example, if the number of queries and/or other operations directed to the cluster within a particular time interval exceeds a first threshold, in at least some embodiments the current iteration of the delete cleanup procedure may be terminated, and the next iteration may be attempted after some time. Such a workload-related condition may be checked, for example, in some embodiments because delete cleanup operations may potentially consume resources which could otherwise be used for responding to customer requests, and customer requests may at least under some operating conditions be assigned a higher priority than the delete cleanup operations themselves.

If the workload-related condition is met, in one embodiment a particular table or data item may be selected from among the data items of the cluster for potential cleanup. Any of a number of algorithms may be used to select a table in different embodiments as discussed below, such as a random selection algorithm, an algorithm which takes the time that has elapsed since the most recent cleanup operation was performed on various tables into account, algorithms in which new tables are selected for analysis based on table entries placed in last-in-first-out queues during earlier iterations of the analysis, and so on. Within the selected table, delete cleanup operations may be performed on a subset of the table's records at a time in at least some embodiments, with the cluster workload again being checked after each subset's cleanup operations or associated analysis is completed. In some embodiments the workload level may be checked even during the delete cleanup operations of a given record group, with the delete cleanup work for the record group being interrupted and suspended if the workload increases beyond some limit. The manner in which the particular subset of the table to be analyzed next for potential delete cleanup operations is selected may vary in different embodiments—e.g., in some embodiments, a "window size" of N records may be selected, and successive windows of the table may be analyzed in sequence, while in other embodiments, windows may be selected at random offsets within a table.

With respect to a selected group of records or portion of a selected table, in some embodiments one or more additional conditions may be checked before any physical delete operations are initiated. In one embodiment, a metric associated with the "dirty" records to which logical delete operations have been directed within the selected portion of the table may be estimated or computed. A record may be designated as "dirty" with respect to deletes, for example, in some embodiments if a request for a logical delete has been recorded with respect to the record, but the content of the record remains in the storage block(s) which were used for the record prior to the request for the logical delete. (It is noted that while records may also be considered dirty with respect to updates or inserts in at least some embodiments, much of the following discussion of dirty records is focused on records which have been logically deleted, not on records which may have been modified or inserted.) In one embodiment, the metric computed or estimated may represent the cumulative size of the dirty records within the group of records being considered. If the metric meets a second criterion (e.g., if the total size of the dirty records within the record group exceeds a threshold, or if the size of the data that would be deleted from at least one chain of data storage blocks exceeds a threshold), in some embodiments a physical delete cleanup operation may be initiated with respect to the record group. In at least one embodiment, the threshold for initiating the physical delete cleanup may require that at least some whole number (greater than zero) of the storage blocks used for the table would be eliminated as a result of the physical cleanup. In some embodiments, the computation or estimation of the metric may involve the examination of various types of table metadata—e.g., a chain of metadata storage blocks containing record identifiers may be examined, and/or a chain of metadata storage blocks containing logical delete entries may be examined, as discussed below in further detail.

In at least one embodiment, a physical cleanup operation may involve replacing one or more storage blocks of the table being considered. For example, consider a scenario in which, prior to the physical cleanup operation being initiated, a chain of four storage blocks B1-B2-B3-B4 was being used to store values of one column C1 of a table T1, while a chain of three storage blocks B7-B8-B9 was being used to store values of another column C2 of T1. During the analysis of a particular group of records of T1, dirty deleted column values of one or more of the records may, for example be found in blocks B2 and B3 (for C1 values) and B9 (for C2 values) in such a scenario. Clean copies of the portions of B2, B3 and B9 which do not contain the logically deleted column values may be generated in at least some embodiments, and the original blocks may be replaced by the clean blocks. In at least some embodiments, the total number of blocks required after the cleanup may be smaller than the total number of blocks which were required before the cleanup—e.g., the column C1 chain B1-B2-B3-B4 may potentially be replaced by B1-B10-B4, with block B10 comprising all the remaining (post-cleanup) records of B2 and B3. In at least one embodiment in which respective chains of storage blocks are used for respective columns, a column-specific compression algorithm may be employed to reduce the total space occupied by the data of individual columns. For example, a compression algorithm CA1 may be applied to column C1, a different compression algorithm CA2 may be applied to column C2, and so on. The appropriate column-specific compression algorithm may be applied to the data included in the replacement storage blocks created during delete cleanup in at least one embodiment. Other types of column-specific transformations, such as encryption and the like, may also be performed at the replacement storage blocks as well as the original storage blocks in some embodiments. In one embodiment, at least one common transformation algorithm may be used for several columns—e.g., the same compression algorithm may be used for columns C1, C2, . . . , Ck of a table.

In an at least one embodiment, a physical cleanup operation may involve overwriting or other in-place writes to one or more storage blocks of the table being considered. For example, consider the same scenario discussed above in which, prior to the physical cleanup operation being initiated, a chain of four storage blocks B1-B2-B3-B4 was being used to store values of one column C1 of a table T1. During the analysis of a particular group of records of T1, dirty deleted column values of one or more of the records may, for example be found in blocks B2 and B3 (for C1 values). Other column C1 values that are not logically deleted in blocks B2 and B3 may be moved, copied or otherwise written to other blocks (e.g., to B1, B3 or B4 from B2, or to B1, B2, or B4 from B3). Once the C1 values are moved or copied to other blocks, then one or both of B2 or B3 may be deallocated or otherwise removed from the chain of blocks storing column C1 values.

It may be the case in some embodiments that for a given group of records of a table, no physical cleanup operation is performed during a given iteration of the analysis. This may occur, for example, if the metric associated with the dirty logically deleted records does not meet the criterion for proceeding with the physical cleanup, and/or if there are no dirty records resulting from logical deletions in the group at all. As mentioned earlier, in some embodiments, after each group of records of a table is analyzed for potential physical cleanup operations (and/or after any such operations that are approved are completed for the record group), the workload of the cluster may be re-evaluated, and any further deletion cleanup-related operations may be deferred if the workload has exceeded an associated threshold. If the workload has not exceeded the threshold, in one embodiment another group of records may be identified for analysis and potential physical cleanup, and the conditional record-group level operations discussed above may be performed iteratively for various record groups of the table until the entire table has been analyzed. After a given table is analyzed for delete cleanup operations using the incremental record-group level approach discussed above, other tables may be selected for analysis and the cleanup analysis associated with record groups of the other tables may be performed incrementally as well in various embodiments. Just as the cluster workload was checked between cleanups of record groups as discussed above, the cluster workload may also be checked between cleanups of individual tables of the cluster in at least some embodiments.

In some embodiments, deletion cleanup operations may be performed for multiple clusters in parallel at a storage service. In one embodiment, a respective deletion cleanup controller process may be instantiated for each cluster managed at the storage service. In some embodiments, deletion cleanup operations may be performed in parallel for more than one table of a given cluster, and/or for one or more record groups of the same table or different tables. In one embodiment, different parameters may be used for the delete cleanup algorithms for respective clusters or data item collections, and/or for respective tables or data items. For example, in such an embodiment, the intervals between successive workload checks may be set to different values for different clusters, the number of records of a record group to be examined at a time for delete cleanup may be set to different values for different tables, and so on.

In one embodiment, a storage service, as described above, may be implemented within a provider network. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries). Respective nodes of a given cluster may be established in different data centers in some embodiments.

Example System Environment

FIG. 1 illustrates an example system environment in which an incremental technique for cleaning deleted data of various data items of a data store with minimal impact on customer workloads may be implemented, according to at least some embodiments. In the depicted embodiment, system 100 may comprise various resources and components of a storage service 102, such as a data warehousing service at which tables containing data of various clients may be stored. Storage service 102 may comprise, among other components, one or more deletion cleanup controllers 110 and one or more workload monitors 120 in the depicted embodiment. In some embodiments, a collection of tables or data items (e.g., tables set up at the request of a given client of service 102) such as collection 130 may be stored and managed using a group of nodes termed a cluster, such as a cluster Clust1 set up on behalf of client C1 in the example shown in FIG. 1. Individual clusters may have their own deletion cleanup controllers 110 and/or workload monitors 120 in some embodiments, e.g., instantiated or configured at a particular type of cluster nodes referred to as leader nodes as discussed in further detail below. In one embodiment, multiple deletion cleanup controllers 110 and/or workload monitors 120 may be established for a single cluster, and such multiple deletion cleanup controllers and/or workload monitors may execute in parallel in some implementations. Conversely, in at least one embodiment, a given deletion cleanup coordinator may be configured for a plurality of clusters. In some embodiments, a workload monitor 120 may be implemented as a subcomponent of a deletion cleanup controller 110.

In one embodiment, a deletion cleanup coordinator 110 may execute multiple iterations of deletion cleanup analysis with respect to a given cluster; for example, by default, a new iteration of deletion cleanup analysis may be initiated once every M minutes, where M may represent a tunable parameter. In a given iteration, in one embodiment the deletion cleanup coordinator 110 may determine, e.g., using information provided by a workload monitor 120, whether the workload of a cluster satisfies a first condition. To meet the first condition, the number of operations of one or more types (e.g., read-only queries, modification operations such as inserts/deletes/updates, or both read and modification operations) that have been directed at one or more data items of the cluster during a time interval (e.g., the last S seconds) may be required to be below a threshold in some embodiments. In one embodiment, the definition of the workload threshold may represent another tunable parameter. If the workload condition is not met, in some embodiments the current iteration of delete cleanup analysis may be abandoned, and the next iteration may be initiated after some time (e.g., after P minutes, where P may be set to the same value as M or to a different value).

If the workload condition is satisfied, in one embodiment a particular data item 140 of the cluster, such as a table T1, may be selected for delete cleanup analysis by the coordinator 110. The contents and associated metadata for data items may be stored according to a variety of storage architectures in different embodiments. In the embodiment depicted in FIG. 1, for example, a columnar architecture may be employed for table records, in which respective chains of storage blocks are set up for respective columns. As such, in the depicted embodiment, column-oriented data storage block chains (DSBCs) 155A and 155B may be used for storing values of columns A and B respectively of table T1. Within a given chain, in some embodiments, storage blocks of a selected fixed size (e.g., 256 kilobytes or 1 megabyte) may be linked to one another via pointers; in other embodiments, storage block sizes may differ within a given chain and/or across different chains. As shown, at a point in time prior to a particular delete cleanup operation, DSBC 155A may comprise at least three storage blocks 157A, 157B and 157C holding values for column A for various records, while DSBC 155B may comprise at least storage blocks 159 and 159B. In at least some embodiments, respective column-specific transformation and/or compression algorithms may be applied to the values stored in the DSBCs—e.g., a different compression algorithm may be used for column A than for column B. In other embodiments, a particular transformation or compression algorithm may be applied to more than one column. In one embodiment, at least a portion of the content of a given table may be stored in a sorted order—e.g., records may be sorted on a sort key comprising one or more columns, and the values of the different columns of the sorted records may be stored in column-specific chains. In some embodiments, storage organizations other than columnar block chains may be used—for example, row-oriented storage may be employed, in which a given storage block may at least in principle comprise values of all the columns of one or more records.

In the depicted embodiment, chains of metadata storage blocks may be employed to store various types of configuration information pertaining to data item 140. For example, the set of metadata storage block chains (MSBCs) 145 may include a record identifier MSBC 146 and a deletion MSBC 148. Record ID MSBC 146 may comprise, for example, storage blocks 147A-147E, with each storage block 147 comprising entries representing some number of records which have been inserted into the data item 140. In at least some embodiments, the record ID entries of MSBC 146 may be stored in sorted order, e.g., based on sort key values selected for the records, based on insertion sequence, or based on other factors.

In response to a request to delete a particular record of data item 140, an entry may be added to deletion MSBC 148 in the depicted embodiment, while the record's content may temporarily remain at the DSBCs that were being used for it prior to the deletion request. A record of a logical delete may thus be stored in MSBC 148 in such embodiments, and the corresponding physical delete operation may be deferred until a deletion cleanup iteration is scheduled.

Deletion cleanup analysis operations may be performed on a group of records at a time in the depicted embodiment, e.g., rather than on all the records of the data item or table. As such, the delete cleanup algorithm may be considered an incremental algorithm in such embodiments. The record groups may be referred to as "windows" in some embodiments (e.g., using a rough analogy to the term "sliding window" employed in some communication protocols such as the Transmission Control Protocol (TCP)). In FIG. 1, a window [n−1] may comprise records whose identifiers and/or addresses are stored in MSBC blocks 147A and 147B, while a current window [n] may comprise records whose identifiers and/or addresses are stored in MSBC blocks 147C and 147D. The deletion cleanup controller 110 may examine the record identifier metadata storage block chain 146 to identify the set of records to be considered for possible deletion cleanup operations in the depicted embodiment. Using the identifiers obtained from RecordID MSBC 146, zero or more entries within deletion MSBC 148 corresponding to the current window [n] may be identified in some embodiments. In the example scenario depicted in FIG. 1, one or more deletion entries 178 (records of logical deletes that have been performed) corresponding to the current window may be identified in blocks 149B and 149C of deletion MSBC 148.

Using the deletion metadata entries 178A, the storage blocks of the DSBCs 155 which comprise dirty deleted data with respect to the current window may be identified in the depicted embodiment. Before a physical deletion cleanup operation is performed, in at least one embodiment one or more additional conditions may be checked, e.g., by the deletion cleanup coordinator 110. For example, if the total amount of dirty deleted data that could be cleaned up is less than a threshold, it may not be deemed cost-effective from a resource usage perspective to perform the physical cleanup in one embodiment; instead, it may be more efficient to wait until more dirty deletes accumulate before performing the physical cleanup. In one embodiment, if removing the dirty deleted data from the DSBCs would result in a reduction of less than K storage blocks from the DSBCs (or from a given DSBC), where K may represent another tunable parameter, the physical cleanup may be deferred. A variety of factors may be taken into account when deciding whether to approve initiation of a physical cleanup operation for a given group of records in different embodiments, as discussed below in further detail.

If a physical cleanup operation is approved, the dirty deleted data may be removed from the DSBCs in the depicted embodiment. The removal may be performed, in the depicted embodiment, by substituting a first set of storage blocks which contain dirty deleted data corresponding to the current window within a given DSBC, with a second set of storage blocks which do not contain the dirty deleted data. For example with respect to DSBC 155B comprising values of column B, storage blocks 159A and 159B may be replaced by a single storage block 159C in the depicted scenario. Storage block 159C may comprise, for example, values of column B which were previously stored in either block 159A or 159B for records which were not logically deleted. In at least some embodiments, a given physical cleanup operation 183 may not necessarily result in a reduction in the number of storage blocks of a given DSBC—e.g., the total amount of pre-cleanup dirty deleted data 179 that was present in storage blocks 157A and 157B may be insufficient to eliminate an entire storage block from the post-cleanup version of DSBC 155A (note that for reasons of space, the post-cleanup version of DSBC 155A is not shown in FIG. 1). In at least some embodiments, a physical cleanup of the DSBCs may be accompanied by a corresponding cleanup of the deletion MSBC 148—e.g., after the dirty data represented by a set of logical deletion metadata entries in MSBC 148 has been removed, those logical deletion entries may also be removed. In other embodiments, the deletion metadata entries may not necessarily be removed; instead, they may be marked to indicate that the corresponding physical deletes have been completed.

After the analysis of a given window (such as window [n]) of records of the table is completed, and any corresponding physical delete cleanups are complete, in at least some embodiments the workload and/or utilization level of the cluster may once again be evaluated, prior to scheduling an analysis of the next window. If the workload or utilization exceeds some threshold, the analysis of the next window of records may be deferred in such embodiments. Similarly, after all the records of a given table have been analyzed during a given iteration of the cluster-level delete cleanup analysis, the workload may be re-evaluated before selecting another table for analysis. In one embodiment, even the deletion cleanup work associated with a given record group may be interrupted and/or suspended if the workload of the cluster increases before the record group has been fully cleaned up. It is noted that the incremental low-overhead approach towards delete cleanup discussed above may be applied with similar success in various embodiments regardless of whether the column-oriented storage block chaining techniques illustrated in FIG. 1 are used or not. It is also noted that delete cleanup techniques similar to those discussed above may be used in embodiments in which data objects are not necessarily stored or managed at a network-accessible service-that is, the use of a storage service as such is not a prerequisite for the success of the deletion cleanup algorithms discussed.

Storage Service Overview

Figure 2:
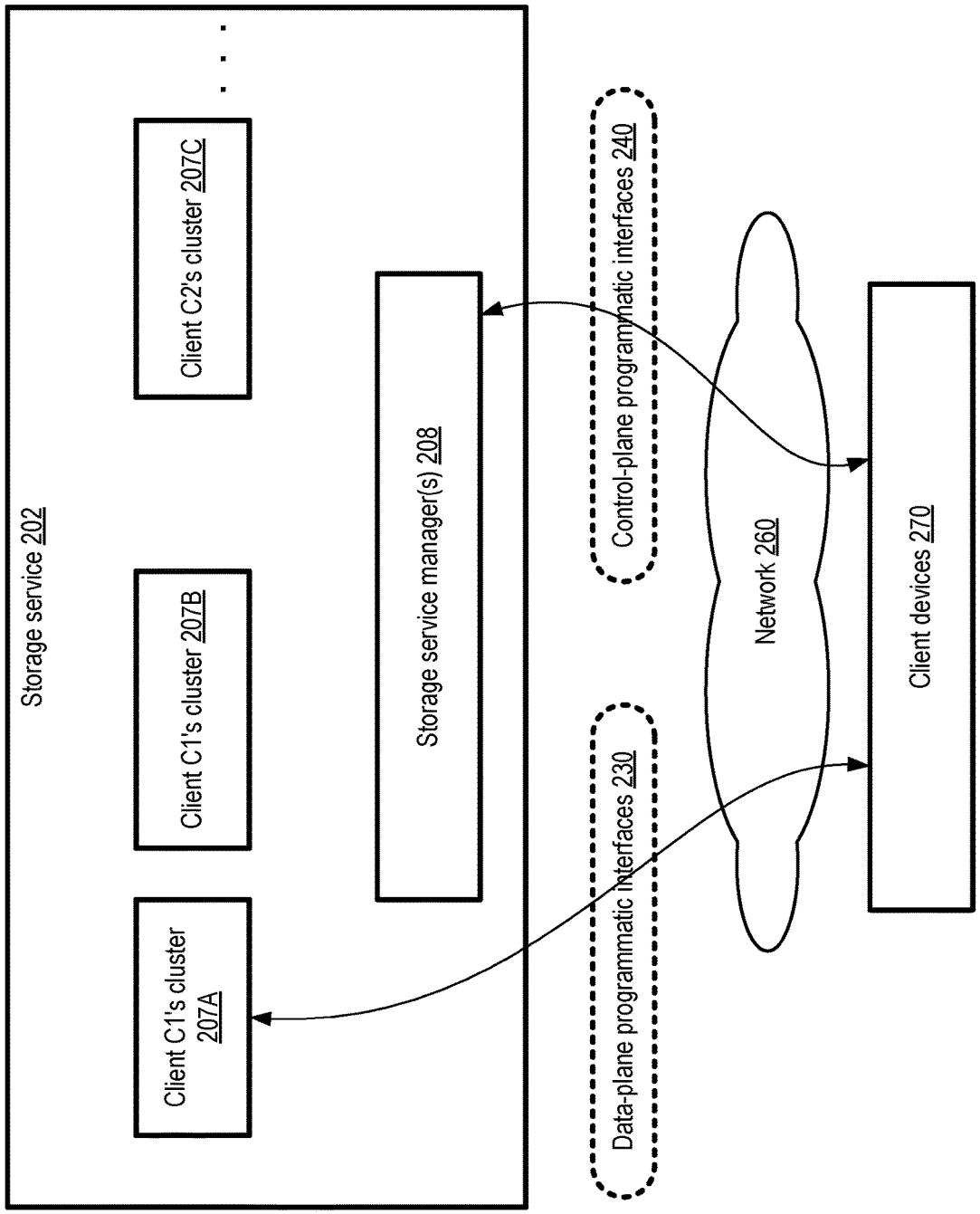
FIG. 2 illustrates an overview of an example storage service at which respective clusters associated with numerous clients may be stored, according to at least some embodiments.

FIG. 2 illustrates an overview of an example storage service at which respective clusters associated with numerous clients may be stored, according to at least some embodiments. As shown, storage service 202 may comprise storage service manager(s) 208, as well as one or more clusters associated with various clients in the depicted embodiment, such as clusters 207A and 207B of client C1, and cluster 207C of client C2. The storage service 202 may implement one or more sets of programmatic interfaces in some embodiments, such as data-plane programmatic interfaces 230 and
control-plane programmatic interfaces 240. Any combination of a variety of programmatic interfaces may be used in various embodiments for either data-plane or control-plane interactions, such as web-based consoles, APIs, command-line tools, and/or graphical user interfaces. Control-plane interactions may include requests (and the corresponding responses) for various types of administrative operations in the depicted embodiment, such as requests to set up or tear down clusters, or requests to change access permissions on clusters. Data-plane interactions may include requests (and corresponding responses) for operations on the content stored in the clusters, such as read queries, inserts, updates, deletes and the like in the depicted embodiment. In some embodiments the storage service may comprise a data warehousing service, e.g., which supports one or more variants of SQL (Structured Query Language) and other types of programmatic interfaces and languages commonly used for data warehousing applications, and manages data using optimization techniques selected for common data warehousing scenarios. In one embodiment, support for a number of data warehousing functions, such as fast querying capabilities over structured data, integration with various data loading and ETL (extract, transform, and load) tools, client connections with business intelligence (BI) reporting, data mining, and analytics tools, and optimizations for very fast execution of complex analytic queries such as those including multi-table joins, sub-queries, and aggregation may be provided by a storage service 202.

In one embodiment, a client of the storage service may communicate with a cluster 207 and/or administrative components of the service such as storage service managers 208 via a variety of client devices 270 such as a desktop computer, laptop computer, tablet computer, personal digital assistant, mobile device, server, or any other computing system or other device configured to send requests to the service and receive responses from the service. A request may be transmitted over a network 260 in some embodiments as a message that includes parameters and/or data associated with a particular function or service offered by the service or by a cluster. Such a message may be formatted according to any appropriate markup language or protocol in various embodiments, such as Extensible Markup Language (XML), a variant of Hypertext Transfer Protocol (HTTP), Simple Object Access Protocol (SOAP) or the like. Clients may communicate with service 202 using a variety of communication methods and network types in the depicted embodiment, such as over Wide Area Networks (WANs) (e.g., the Internet), private networks, intranets, and the like. A client may assemble a message including a request and convey the message to a network endpoint (e.g., a Uniform Resource Locator (URL)) corresponding to a cluster 207 or a service manager 208) in some embodiments. For example, client C1 may be provided a network endpoint similar to "http://mycluster.com" to send various request messages to cluster 207A or 207B. Multiple clients (or users associated with a particular client account) may be provided a network endpoint for a particular cluster 207 in some embodiments. Responses or other data sent to clients may be formatted and transmitted in similar ways in various embodiments.

Individual clusters 207, such as 207A-207C, may be made up of one or more nodes in the depicted embodiment. Respective clusters may include different numbers of nodes in some embodiments. A node may comprise a server, desktop computer, laptop, or, more generally, any other computing device in various embodiments. In some embodiments, the number of nodes in a cluster may be modified, such as in response to a cluster scaling request or modification request, or based on an automated scaling algorithm being implemented by the service. In some embodiments, some nodes of a cluster 207 (such as non-leader nodes, discussed below in further detail in the context of FIG. 3 and FIG. 4) may be logically partitioned into resource slices. A given slice may be allocated a portion of the node's memory and storage space, and respective portions of the workload assigned to the node may be processed at respective slices in such an embodiment. In some embodiments, a special type of node called a leader node may distribute data to the slices and may apportion the workload comprising various operations (including for example delete cleanup operations) to the slices. The slices of a node may work in parallel to complete the operations in at least one embodiment.

Example Node Types

Figure 3:
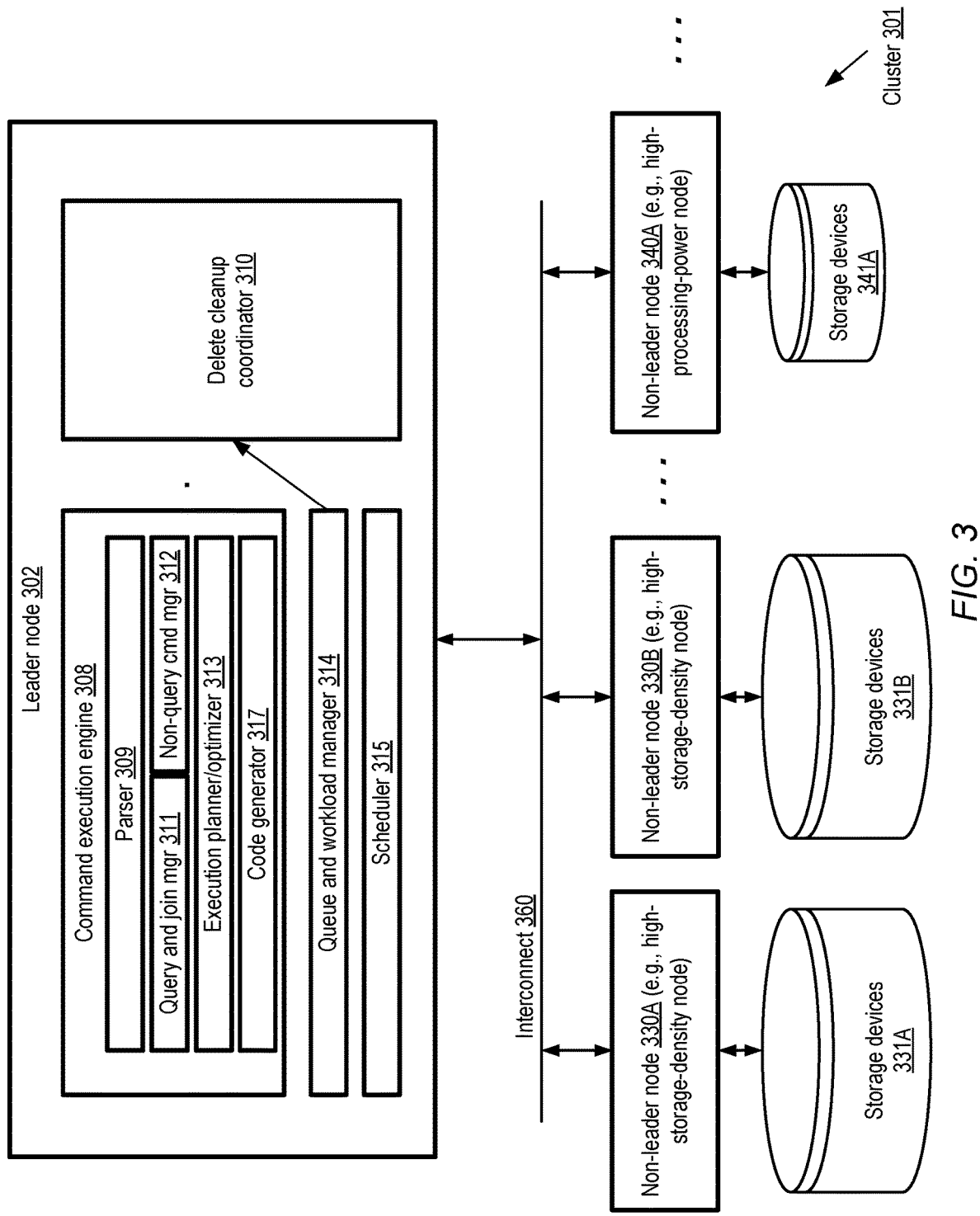
FIG. 3 illustrates examples of types of cluster nodes which may be configured for clients of a storage service, according to at least some embodiments.

FIG. 3 illustrates examples of types of cluster nodes which may be configured for clients of a storage service, according to at least some embodiments. A cluster 301 may comprise a leader node 302 and some number of non-leader nodes such as nodes 330A, 330B and 340A in the depicted embodiment. In some embodiments, e.g., if the amount of data to be managed at a cluster is below a threshold, a single node may be sufficient for a cluster (and, as a result, separate "leader" vs. "non-leader" roles may not be required). Non-leader nodes may be referred to as compute nodes in some embodiments. Non-leader nodes may be linked to a leader node via any of various types of interconnects 360 in various embodiments. In the depicted embodiment, the storage service at which cluster 301 is established is assumed to support various types of database operations such as joins and the like; in other embodiments, similar clusters may be established within storage services which do not necessarily support at least some traditional types of database operations.

In one embodiment, a leader node 302 may manage communications with client devices and application programs, and clients may not interact directly with non-leader nodes. In the depicted embodiment, a leader node may include a command execution engine 308, a queue and workload manager 314, a scheduler 315 and a deletion cleanup coordinator 310. In some embodiments, individual ones of the subcomponents of the leader node may be implemented using respective sets of one or more processes or threads of computation. The execution engine may comprise, for example, a parser 309, a query and join manager 311, a non-query command manager 312, an execution planner/optimizer 313, and a code generator 317 in one embodiment. The parser 309 may, for example, analyze received client commands or requests and convert them into an initial internal format for execution in some embodiments. Depending on the specific type of operation requested by the client, the request may next be handed over to a query and join manager 311 or a non-query command manager 312 in such embodiments. Specific optimized plans to carry out the requested operations (such as the series of steps necessary to obtain results for complex queries) may be developed at execution planner 313 in the depicted embodiment. Based on the optimized execution plan, executable code may be generated by the code generator 317 in the depicted embodiment for distribution to one or more non-leader nodes where the code may be executed. Respective portions of the data of a cluster 301 may be assigned to individual ones of the non-leader nodes (or to specific resource slices within the non-leader nodes) by the leader node in some embodiments, e.g., in response to record insertion requests and the like. In one embodiment, some types of metadata such as catalog tables may be stored at a leader node, and queries directed to such metadata may be handled at the leader nodes without involving non-leader nodes.

In the depicted embodiment, two non-leader node types may be supported: high-storage-density nodes such as 330A and 330B, or high-processing-power nodes such as 340A dense storage nodes and dense compute nodes. As indicated by their names, the two types of non-leader nodes may be optimized for storage and computations respectively in such embodiments. In at least one embodiment, different sizes and types of storage devices (such as devices 331A, 331B and 341A) may be configured for the different nodes. For example, in one embodiment, magnetic-disk based storage devices may be used for some types of nodes, while solid state drives (SSDs) or optical storage devices may be used for other types of nodes. A variety of storage configurations, such as various types of redundant arrays of inexpensive disks (RAIDs), JBODs ("just a bunch of disks"), storage area networks (SANs), network access storage (NAS) devices and the like may be used in different embodiments. In some embodiments, the amount of storage that can be set up at a given node, the types of storage devices used, and/or the number or types of processors or cores used for computations, may be modified. Clients whose applications are compute-intensive may set up more high-processing-power nodes relative to high-storage-density nodes in at least some embodiments. In one embodiment, by modifying the resources assigned to a given node, the type of the node may be changed, e.g., from high-storage-density nodes to high-processing-power nodes or vice versa. The queue and workload manager 314 of the leader node 302 may be responsible in the depicted embodiment for distributing the client-submitted workload into various queues for the non-leader nodes, while the scheduler 315 may be responsible for issuing individual work requests to the non-leader nodes. Load balancing operations with respect to non-leader nodes may be performed by the queue and workload manager 314 in the depicted embodiment. Responses to the work requests sent to the non-leader nodes may be aggregated at the leader node in some embodiments, e.g., to generate the final responses provided to client-submitted requests.

In some embodiments, information about the workload of the cluster, which may be used in deciding whether to perform deletion cleanup operations as discussed above may be obtained by the deletion cleanup coordinator 310 from the queue and workload manager 314. In other embodiments, other sources may be used for workload monitoring, such as performance analysis tools that may be installed at the various nodes of the cluster, or logs that may be generated at the various nodes. In one embodiment, at least some of the metadata examined for making the decision as to whether a physical delete cleanup operation for a given record group is to be initiated may also be stored at, or available at, the leader node. In such an embodiment, both of the types of conditions that are checked prior to performing physical delete operations may be verified at the leader node, and requests for performing the approved physical deletion cleanup operations may be transmitted to the appropriate non-leader nodes by the delete cleanup coordinator 310 from the leader node. The physical cleanup operations, such as the replacement of the storage blocks containing dirty deleted data, may be implemented at the non-leader nodes in some embodiments. In other embodiments, a different approach regarding the distribution of responsibilities regarding deletion cleanup may be implemented—e.g., at least some of the conditions may be checked at non-leader nodes, and/or physical cleanup operations may be performed by leader nodes. In at least one embodiment, one or more processes responsible for performing delete cleanup-related analysis and operations (such as a delete cleanup coordinator process) may be instantiated in a background or low-priority mode, e.g., at the leader node 302 and/or at one or more of the non-leader nodes.

Example Components of Non-Leader Nodes

Figure 4:
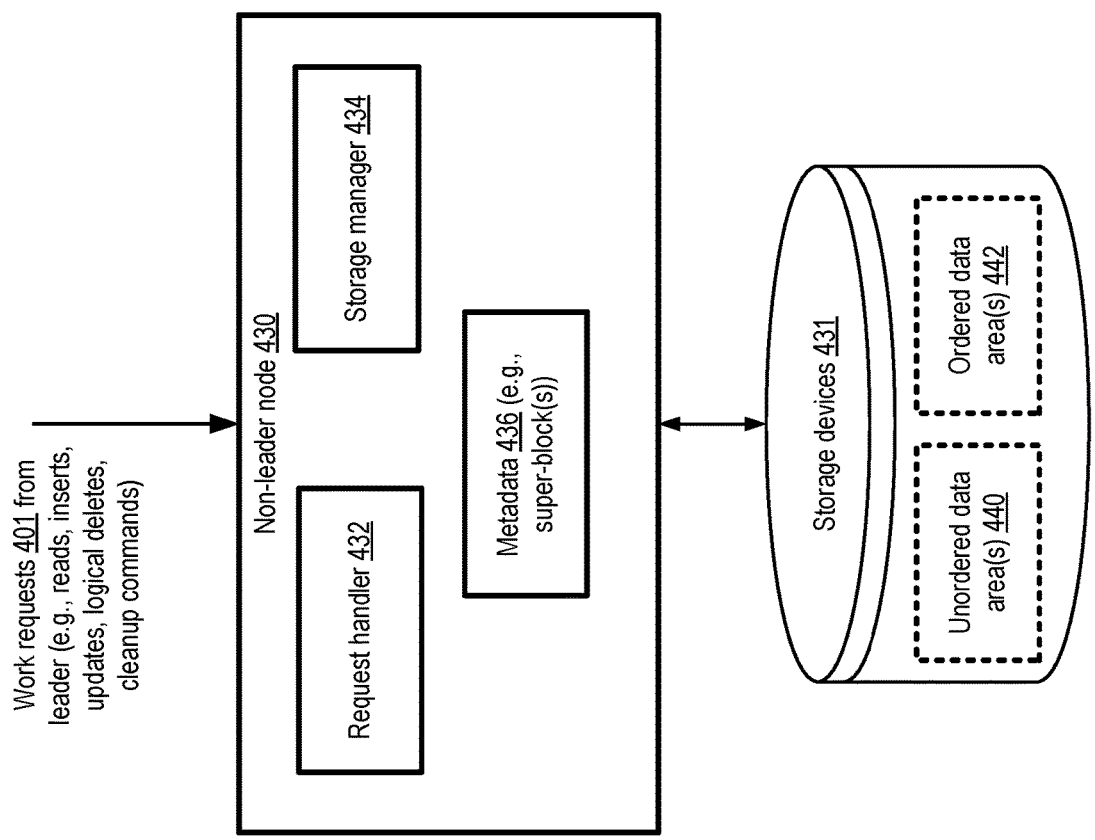
FIG. 4 illustrates components of a non-leader node of a cluster, at which at least some deletion cleanup-related operations may be performed, according to at least some embodiments.

FIG. 4 illustrates components of a non-leader node of a cluster, at which at least some deletion cleanup-related operations may be performed, according to at least some embodiments. In the depicted embodiment, a non-leader node 430 may comprise at least a request handler 432, a storage manager 434, a set of local metadata 436 pertaining to data stored at the non-leader node, and a set of storage devices 438. In one implementation, respective sets of one or more processes or threads of execution may be instantiated for the request handler 432 and/or the storage manager 434.

In some embodiments, local metadata 436 may include entries for the storage blocks stored at the non-leader node 430, comprising block chain or mapping information describing the order in which data for various records is stored at various locations within storage devices 438. At least a portion of the metadata 436 may be referred to as a super-block in some embodiments. In at least one embodiment, metadata for the storage blocks may be stored in multiple different locations, such as within the storage blocks, or in other data structures which may or may not be stored at the non-leader node 430. In one embodiment, instead of or in addition to being stored at the non-leader node, at least some of the storage block metadata that can be used to respond to work requests 401 submitted to the non-leader node may be stored at other locations or devices external to the non-leader node, from which the metadata may be accessed by various components of the non-leader node such as the request handler 432 and/or the storage manager 434.

In some embodiments, work requests 401, generated for example on behalf of clients of the storage service at a leader node, may be transmitted to a non-leader node 430 over a network. A number of different types of work requests may be received in the depicted embodiment, such as reads, inserts, updates, logical deletes, delete cleanup commands and the like. In at least some embodiments, at least some of the work requests or commands may initially be examined or processed at the request handler 432. In one embodiment, request handler 432 may communicate with storage devices 438, at which storage blocks containing data for various data objects such as tables of the cluster may be located. In at least one embodiment, the storage blocks may be organized into column-oriented chains, as discussed above with regard to FIG. 1. Depending on the type of work request, request handler 432 may write data to the storage devices 438, read data from the storage devices 438, perform reads as well as writes, and/or transmit internal requests to the storage manager 434 in the depicted embodiment. The storage manager 434 may be configured to perform various types of physical storage operations on the data in storage devices 438, e.g., including compacting and/or sorting data in the storage blocks according to an ordering schema for various tables. Although depicted as implemented in a non-leader node in FIG. 4, in some embodiments request handler 432 or storage manager 438 may be implemented at leader nodes such as those described above with regard to FIG. 3, or at some other component or module of the storage service. Various combinations of hardware and software components or devices may be used to implement the request handler 432 and/or storage manager 438 in different embodiments.

In one embodiment, storage devices 438 may include one or more portions or areas 440 for unordered data, and one or more portions or areas 442 for ordered (e.g., sorted) data. In response to the corresponding types of work requests, request handler 432 may store inserts and/or modifications in an unordered data 440 in the depicted embodiment. For example, as new updates come in, the updates may be appended to an unordered data area 440 (which may be logically mapped to one or more different physical storage locations) in some embodiments. A record, copy, or other indication of the update to insert/modify may be maintained in various embodiments. In some embodiments, as a result of persistently storing inserts and modifications into an unordered data area 440, updates to a data object may not be made in-place. In at least some embodiments, a storage manager 434 may sort unordered data according to the same ordering schema as applied to ordered data (e.g., either at regular intervals or at non-regular intervals) prior to performing at least some types of operations such as propagating updates to an ordered area or responding to a query. For example, if the ordered data is sorted according to a primary or sort key value, then the unordered data may be sorted according to the same primary or sort key value in such embodiments. In one embodiment, unordered and/or ordered data areas may comprise chained storage blocks of the kind discussed above. In one embodiment, in response to a logical delete request from the leader node, request handler 432 may mark one or more portions of data for deletion in an ordered data area 442. (As indicated earlier, from the perspective of a client of the storage service, in at least some embodiments delete requests may not necessarily be classified as logical deletes versus physical deletes. Instead, in such embodiments, only a single type of delete operation may be supported, and the processing of a given delete request may be managed in separate phases involving logical delete requests being sent to the non-leader nodes, followed eventually by delete cleanup requests which result in the physical removal or overwriting of the data targeted for deletion.)

In at least one embodiment, after a decision as to whether an incremental delete cleanup operation is to be performed with respect to a particular group of records is reached, a storage manager 434 may be responsible for performing one or more physical operations associated with the group. Such physical operations may for example comprise, in one embodiment, copying the non-dirty data (data which has not been logically deleted) from one or more of the storage blocks which contained dirty deletes to one or more replacement blocks, consolidating or compacting the non-dirty data, and adjusting the chain pointers if necessary to replace the original set of storage blocks with the blocks from which the dirty data has been removed. In one embodiment, newly-inserted or newly-modified data, which may have been stored in an un-ordered area 440, may be included in the replacement blocks by the storage manager. In other embodiments, a procedure separate from the delete cleanup operations may be used for incorporating newly-inserted data and/or newly-modified data into the ordered area(s). In at least one embodiment, compression algorithms (such as various column-specific compression algorithms) and/or sorting algorithms may also be applied to the replacement blocks during the delete cleanup operations.

In various embodiments, independently of and asynchronously with respect to the delete cleanup operations and the operations associated with inserts and modifications, work requests comprising read queries for data may be received at request handler 432. Request handler 432 may access ordered data areas 440 and/or unordered data areas 442 to service read queries in some embodiments. In some embodiments, as indicated earlier, data may be stored in a column-oriented manner at the non-leader node 430. However, the techniques described above for managing logical deletes, delete cleanups, inserts, data modifications and the like may be applied with equal success regardless of whether column-oriented storage is used or not.

Methods for Delete Cleanup

Figure 5:
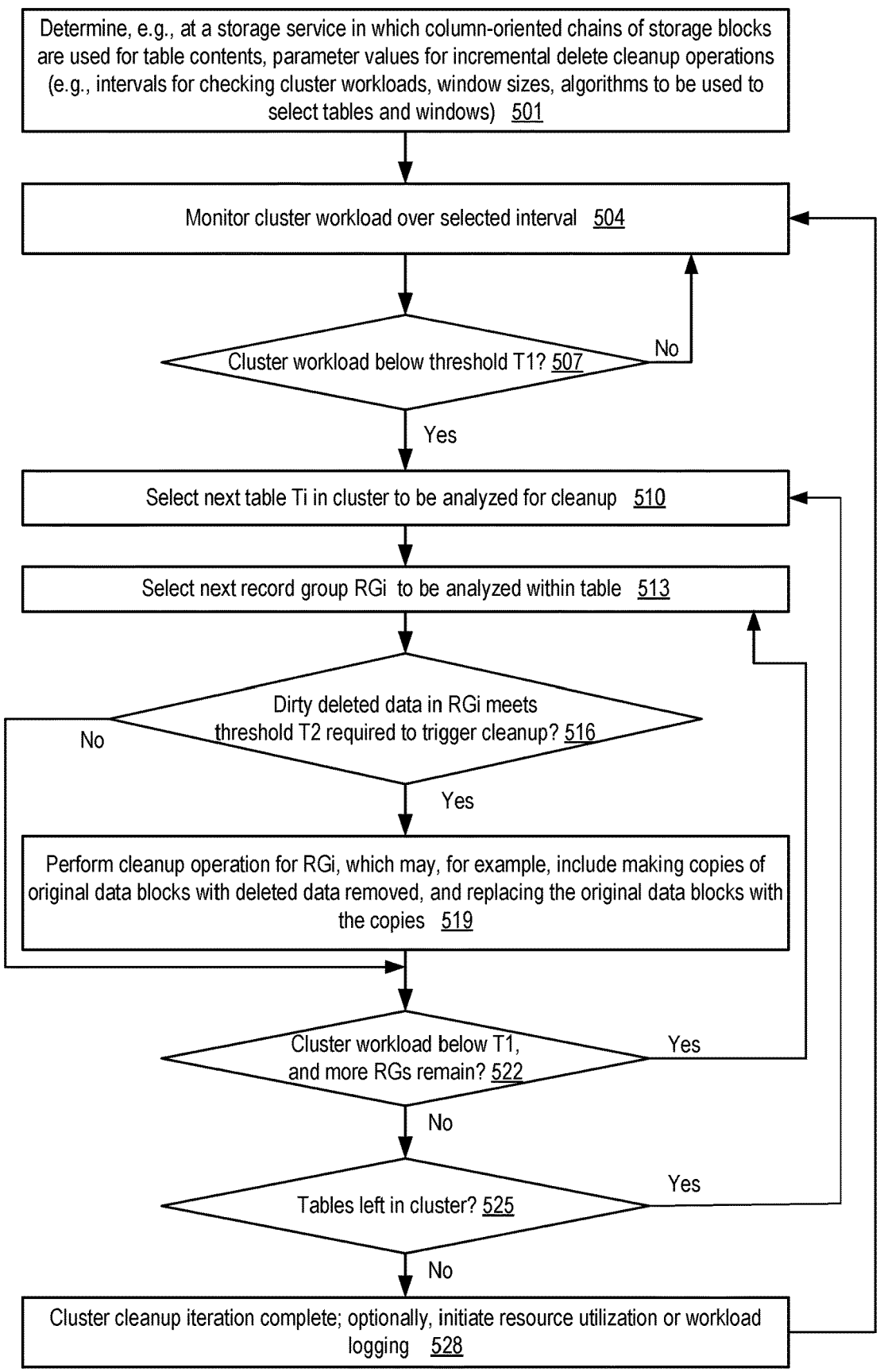
FIG. 5 is a flow diagram illustrating aspects of operations which may be performed to implement an incremental low-overhead technique for cleaning deleted data of a cluster, according to at least some embodiments.

FIG. 5 is a flow diagram illustrating aspects of operations which may be performed to implement an incremental low-overhead technique for cleaning deleted data of a cluster, according to at least some embodiments. As shown in element 501, values for a set of parameters for incremental delete cleanup operations may be determined in some embodiments, e.g., at a storage service in which column-oriented chains of storage blocks are used for storing records of data items such as tables. Such parameters may include, for example, intervals for checking workload levels, window sizes (the number of records to be considered in each incremental analysis step of the delete cleanup iterations), the algorithms to be used to select tables when multiple tables remain to be analyzed within a cluster, levels of parallelism (e.g., how many tables should be analyzed for delete cleanups at a time in parallel, how many record groups should be analyzed in parallel), and so on in various embodiments. In some embodiments, machine learning models or other optimization techniques may be used to identify appropriate parameter values for different collections of data items being managed, as discussed below in further detail with respect to FIG. 8. In at least one embodiment, a storage service may comprise or have access to a knowledge base in which records of delete-related processing are stored, indicating for example levels of performance overhead measured for various combinations of data set sizes and delete cleanup-related parameters, and such knowledge base entries may be examined to select parameter values.

In one embodiment, at least one delete cleanup coordinator process or thread may be established for a given cluster or collection of data items. In other embodiments, a given delete cleanup coordinator process or thread may be configured to orchestrate delete cleanup operations for multiple clusters. A given delete cleanup coordinator may perform multiple iterations of analysis with respect to a given cluster in the depicted embodiment.

During a particular iteration, the workload of a particular cluster with respect to which delete cleanup analysis is to be performed may be monitored over a selected time interval in the depicted embodiment (element 504). A number of different factors may be considered in the monitoring in various embodiments: for example, a count of the number of operations of one or more types (e.g., read queries, all operations, etc.) requested on behalf of clients may be obtained, and/or resource utilization levels at the cluster nodes may be captured periodically, and so on. If the cluster's workload is found to be above a threshold level T1 during the time interval, as detected in operations corresponding to element 507, the current iteration may be terminated, and the next iteration may be begun after some time interval.

If the cluster workload level is below T1, as also detected in operations corresponding to element 507, one or more additional conditions may be checked before physical delete cleanup operations are initiated in the depicted embodiment with respect to a given data item such as a table. For example, if the cluster comprises several tables, the next table $T_i$ to be analyzed for cleanup may be selected (element 510) in various embodiments. Any of a number of different algorithms may be used to select the table in different embodiments, as discussed in further detail below with respect to FIG. 7. For example, random selection may be used in some embodiments, while in other embodiments a table may be selected based at least in part on the time that has elapsed since that table was most recently analyzed for delete cleanup, or the time that has elapsed since a physical cleanup operation was performed on the table.

Within a given data item such as a table $T_i$, in at least one embodiment, delete cleanup operations may be performed on only a subset (or "window") of records at a time, with the workload of the cluster being re-evaluated after every group of records is analyzed. The size of the record groups, and the manner in which the next group to be analyzed is selected, may vary in different embodiments. The next record group $RG_i$ to be analyzed may be identified (element 513) in the depicted embodiment, e.g., by the delete cleanup coordinator.

As part of the analysis of $RG_i$, a determination may be made as to whether the dirty deleted data currently stored within $RG_i$ satisfies a threshold condition T2 which is required to trigger a physical cleanup (element 516). Different types of conditions, or combinations of conditions, may have to be satisfied in various embodiments in order for an approval of a physical cleanup operation. In some embodiments, for example, the approval may be contingent upon the amount of storage space that would be freed up if the physical cleanup were performed. If, as a result of the cleanup, the count of storage blocks used for the table may be reduced by at least K (where K may represent a tunable integer parameter greater than zero) in one embodiment, a physical delete cleanup operation may be initiated or performed. In other embodiments, instead of or in addition to taking space savings into account, the time that has elapsed since one or more logical deletions resulted in a portion of storage being marked as dirty may be considered when making a decision as to whether the physical cleanup should be performed—e.g. if more than M minutes have elapsed since a logical delete of a given record of $RG_i$ was performed, a physical cleanup operation may be scheduled in such embodiments.

If and when a physical cleanup operation is approved for $RG_i$ based on the condition(s) verified in operations corresponding to element 516, in some embodiments the physical cleanup operation may be initiated (e.g., at one or more non-leader nodes of the kind discussed above). In the physical cleanup operation, in one embodiment, a copy of the clean data of $RG_i$ may be made at one or more new storage blocks, and the original storage blocks may be replaced by the new storage blocks (element 519). In another embodiment, in-place writes may be performed on the storage blocks currently storing data for a table so that data record(s) (or portion(s) thereof) are moved from one data block to another). In such an embodiment, after moving data records to other data blocks, a data block with only dirty records remaining can be scrubbed for re-use or deallocated for storing data for the table. In embodiments in which chains of storage blocks are used for respective columns, the cleanup operations may be performed separately for each chain or column affected by the logical deletes. In at least one embodiment, directives for the physical delete cleanup operations may be transmitted from one component of the service (e.g., a leader node) to another component (e.g., a non-leader node) responsible for low-level storage operations such as copying, compacting/compressing data, sorting data and the like. In another embodiment, the non-leader nodes may detect (e.g., element 516) and perform (element 519) the cleanup operation. In one embodiment, the workload of the cluster may be checked periodically, e.g., once every Q seconds, during the physical cleanup of any given record group, and if the workload meets a threshold condition (which may be the same threshold checked in operations corresponding to element 507, or may be a different threshold), further work of the physical delete cleanup of the record group itself may be deferred. In one implementation, for example, a timer may be set to wake up a process or thread that checks a workload metric every Q seconds, and an interrupt may be transmitted to a process performing the physical delete cleanup if the workload exceeds the threshold. In an embodiment in which the incremental, record-group level physical cleanup operation is itself interrupted based on changes to workloads, the record-level physical cleanup operation may be allowed to proceed to a consistent state before being suspended or stopped. For example, the storage service may ensure that a storage block chain being cleaned up when a workload-based interrupt is received is not left with inconsistent pointers, and that a given record is either fully included in the storage blocks or completely removed in such an embodiment.

After the physical cleanup operations (if any were approved) with respect to $RG_i$ are completed in the depicted embodiment, if any more record groups of table $T_i$ remain unanalyzed, the workload level of the cluster may be re-evaluated. If the cluster workload meets a threshold condition (e.g., T1) for continuing delete cleanup analysis for the table being examined, as detected in operations corresponding to element 522, the next record group of $T_i$ which is to be analyzed may be selected, and operations corresponding to elements 513 onwards may be repeated.

If the cluster workload does not satisfy the condition for continuing $T_i$'s analysis, or if no more record groups remain (as also detected in operations corresponding to element 522), a determination may be made as to whether any other tables remain unexamined with respect to the cluster in the current iteration of analysis in the depicted embodiment. If there are one or more tables left (as determined in operations corresponding to element 525), operations corresponding to elements 510 onwards may be repeated in at least some embodiments—e.g., the next table may be selected, and incremental analysis may be initiated on groups of records of that table as discussed above. If no tables remain unexamined (as also detected in operations corresponding to element 525), the current iteration of delete cleanup analysis for the cluster may be deemed completed (element 528). Optionally, in some embodiments, logging of resource utilization levels and/or workload requests may be performed during the interval before the next iteration of analysis is performed (e.g., by repeating operations corresponding to element 504 onwards). Such logging information may be used in one embodiment to automatically adjust parameters of the delete cleanup procedure, as discussed below in further detail. In at least one embodiment, the workload thresholds which have to be met in operations corresponding to element 507 may differ from the workload thresholds which have to be met in operations corresponding to element 522. In some embodiments, the triggering requirements for initiating or causing physical cleanup operations (checked for example in operations corresponding to element 516) may differ from one table or data item to another. In at least some embodiments, different sets of parameters for delete cleanup operations may be used for different clusters.

Figure 6:
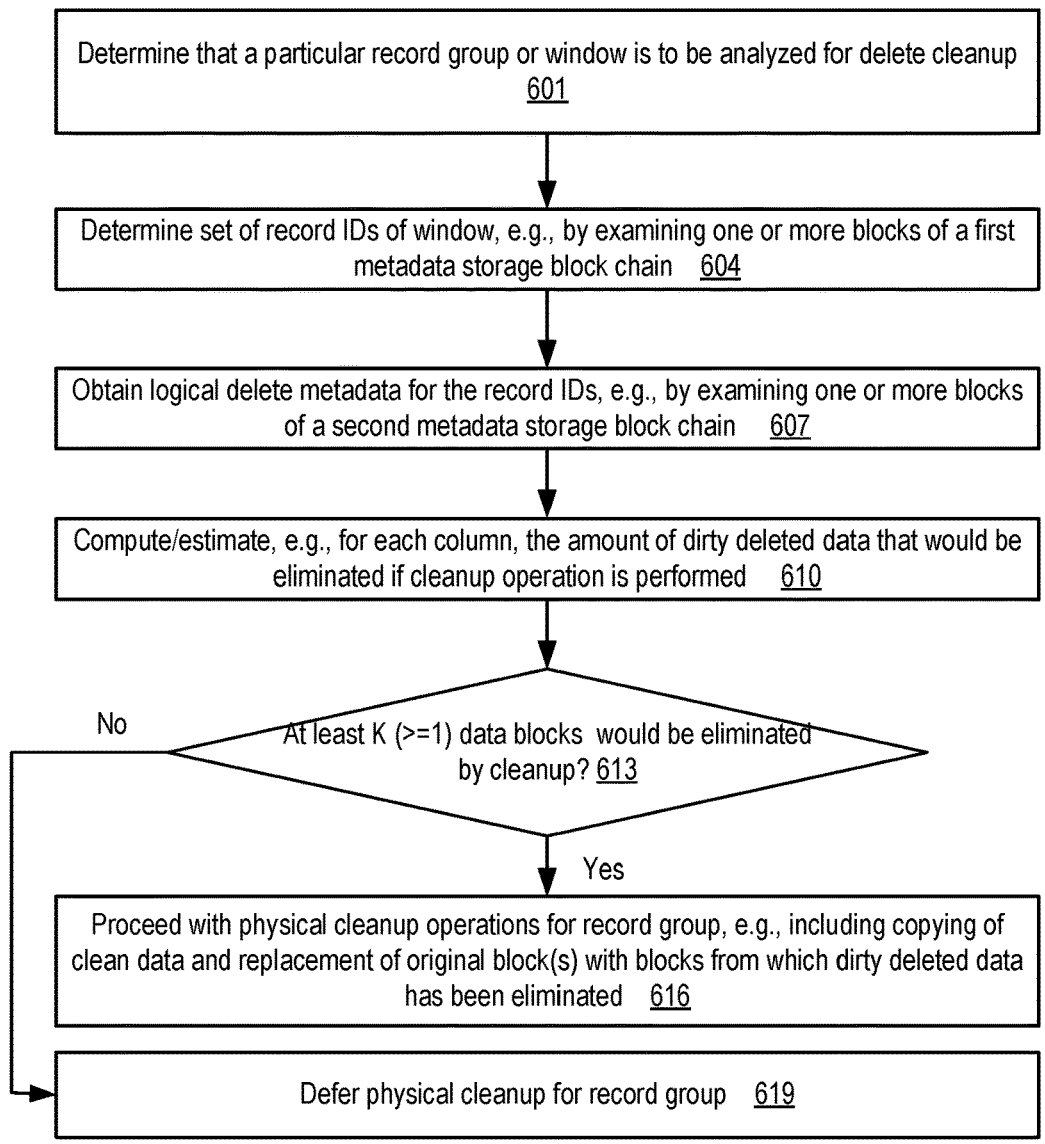
FIG. 6 is a flow diagram illustrating aspects of cleanup-related operations which may be performed with respect to a group of records of a data item, according to at least some embodiments.

FIG. 6 is a flow diagram illustrating aspects of cleanup-related operations which may be performed with respect to a group of records of a data item, according to at least some embodiments. In one embodiment, a determination may be made, e.g., at a delete cleanup coordinator associated with one or more data item collections or clusters, that a particular record group of a data item is to be analyzed for delete cleanup (element 601). Such a determination may be made, for example, after a condition pertaining to a workload level of the cluster has been checked and the workload has been found to be in an acceptable range in at least some embodiments. In one embodiment a "sliding window" approach may be used with respect to incremental delete cleanup analysis operations for the records within a table—e.g., records may be examined in groups of N at a time, in the order in which the records are arranged or stored in storage blocks, with the next set of N unexamined records being considered in each incremental step. In at least some embodiments, the set of N records examined at one time may or may not overlap or otherwise include records examined in a previous group.

A set of record identifiers for the group or window may be identified (element 604) in the depicted embodiment, e.g., by examining contents of a record ID metadata structure. In some embodiments, metadata pertaining to various record identifiers (e.g., including the physical storage address or location at which a logical deletion entry for a record may be stored, and/or including the storage addresses or locations at which column values of various columns of the record are stored) may be stored in chains of storage blocks, and the appropriate storage blocks of such chains may be examined. Logical deletion entries or metadata may also be stored in storage block chains in at least one embodiment, so one or more blocks of a chain representing a second level of metadata may be analyzed in such an embodiment (element 607) to obtain an indication of the potentially dirty deleted records.

In the depicted embodiment, the amount of dirty deleted data that would be eliminated if a physical cleanup operation is performed for the record group may be computed or estimated (element 610). In an embodiment in which the data is stored in respective storage block chains per column, such computations or estimations may be performed a column at a time. In one embodiment, the logical deletion metadata entries and/or other metadata may include indications of the sizes of the dirty portions of the data associated with various records and/or columns, and the size may be computed/estimated using the metadata itself. In another embodiment, the metadata may be used to determine where the dirty deleted data is stored, and the storage blocks containing the deleted data may be examined to estimate or compute the size.

A determination may be made in some embodiments as to whether the amount of deleted data that would be eliminated exceeds a threshold required to trigger the physical cleanup operations. For example, in the depicted embodiment, at least K (where K may be a tunable integer parameter greater than or equal to one) data blocks may have to be eliminated in order for the physical delete cleanup operation to be approved. If the minimum-of-K data block condition is satisfied (as determined in operations corresponding to element 613), the physical cleanup operations for the record group may be performed (element 616) in some embodiments. As discussed earlier, the physical cleanup operations may include copying clean data (data for which delete requests have not been submitted by clients) to one or more new storage blocks and replacing the original storage blocks with the new storage blocks in one embodiment. In other embodiments, the physical cleanup operations may be performed in place, e.g., by overwriting or zeroing-out the dirty data and/or re-arranging the clean data within the original storage blocks. If the condition regarding the elimination of a minimum of K blocks is not satisfied, the physical cleanup operations for the current group of records may be deferred in the depicted embodiment (element 619).

In one embodiment, a condition pertaining to the minimum amount of storage reduction required for approval of a physical cleanup operation may be evaluated taking multiple (or all) columns into consideration together—e.g., if the minimum number of blocks K is 3 in the above example, and one block would be eliminated from a block chain for column A of the table, one block would be eliminated from a block chain for column B, and a third block would be eliminated from a block chain for column C, the condition would be satisfied. In another embodiment, the condition may be applied individually to at least one column—e.g., if K=3, at least one column's chain would have to be reduced by 3 storage blocks for the condition to be satisfied. As discussed below in the context of FIG. 7, the conditions for approving physical cleanup may not necessarily be based solely on the amount of reduction in storage requirements in some embodiments.

Algorithm and Parameter Examples

Figure 7:
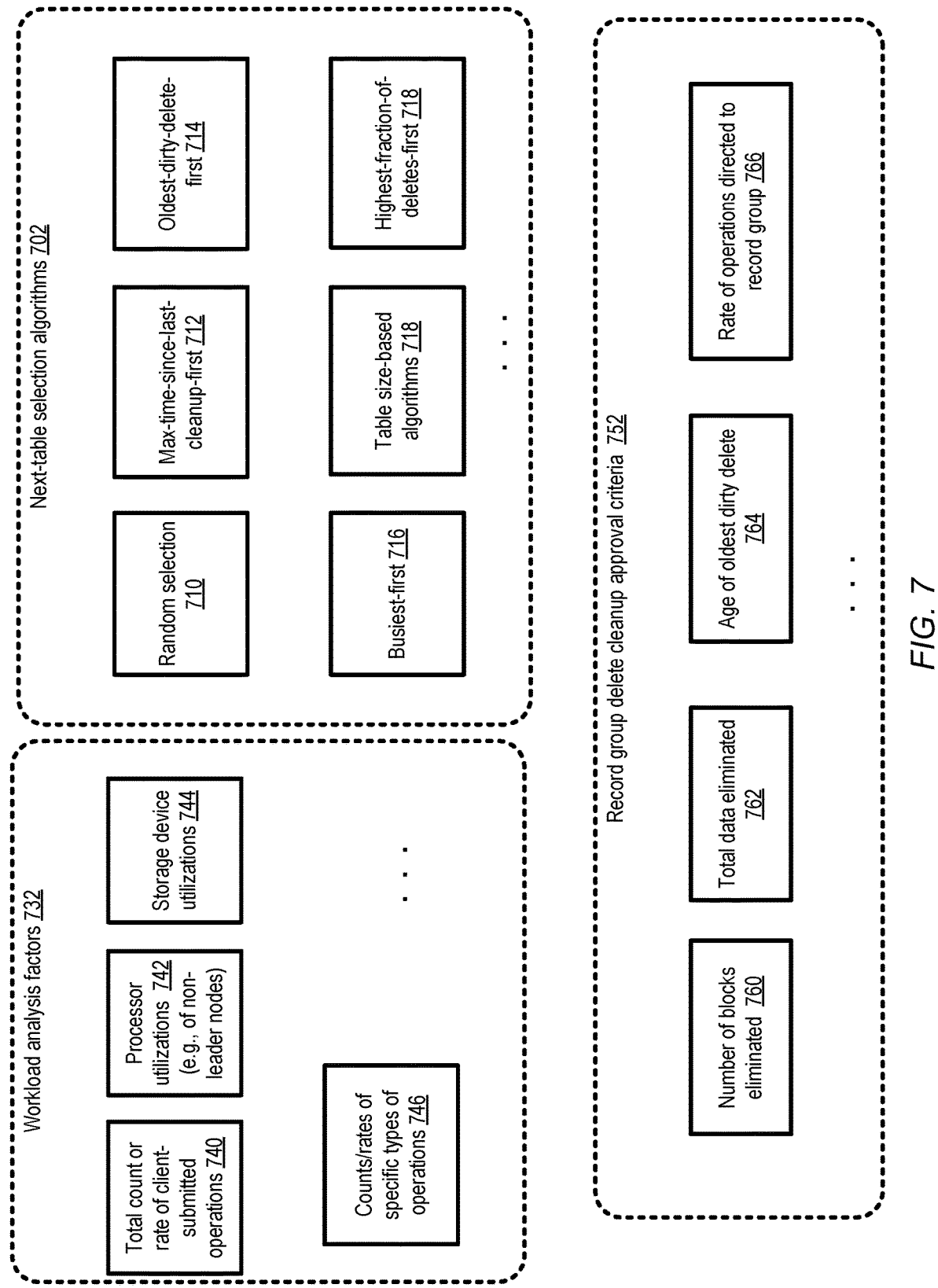
FIG. 7 illustrates examples of algorithms which may be used to select tables of a cluster to be analyzed for deletion-related cleanup operations, and factors which may contribute to approval criteria for initiating cleanup of a group of records of a table, according to at least some embodiments.

FIG. 7 illustrates examples of algorithms which may be used to select tables of a cluster to be analyzed for deletion-related cleanup operations, and example factors which may contribute to approval criteria for initiating cleanup of a group of records of a table, according to at least some embodiments. In one embodiment, a combination of one or more of the workload analysis factors 732 may be considered when determining whether a given iteration of delete cleanup operations for one or more tables of a cluster is to be scheduled. The total count (or rate) 740 of client-submitted operation requests directed to the cluster as a whole during a selected time interval may be compared to a threshold, and/or the counts or rates of specific types of operations 746 (such as modifying operations as opposed to read-only operations) may be compared to respective thresholds in various embodiments. In at least one embodiment, resource utilizations such as processor utilizations 742 and/or storage device utilizations 744 at one or more types of nodes such as non-leader nodes may be considered when analyzing workload levels. In some embodiments workloads may be analyzed at a finer granularity than the cluster level—e.g., operation counts may be analyzed at a per-table or per-data-item level before deciding whether delete cleanup operations for that data item should proceed to the next phase.

Algorithms 702 for selecting the particular table within a cluster which is to be analyzed next, if the workload-related conditions are satisfied, may include, for example, random selection 710 in the depicted embodiment. In some embodiments, temporal properties of dirty deleted data may be taken into account—e.g., according to a max-time-since-last-cleanup-first algorithm 712, the particular table whose last physical cleanup operation (or last analysis for physical cleanup) was performed earliest among the tables being considered may be selected as the next table to be analyzed. In another temporal approach referred to as oldest-dirty-delete-first algorithm 714, the table which has retained a dirty delete for the longest time period among the set of tables being considered may be selected as the next table to be analyzed in some embodiments. In at least one embodiment, one or more queues may be maintained, e.g., by a delete cleanup coordinator, in which entries for respective tables may be ordered based on how old their oldest dirty deletes are, or based on when dirty delete cleanup operations were performed on the tables, and such queues may be examined to identify the next table to be examined. In one embodiment, a busiest-first algorithm 716 may be employed, in which the table with the highest count or rate of operations over some time period may be selected first for analysis. In other embodiments, algorithms 718 which take overall table size into account may be employed—e.g., the largest table of the cluster may be analyzed first, or the smallest table may be analyzed first. In at least one embodiment, the storage service may maintain statistics regarding the mix of different types of operations (e.g., deletes versus queries versus inserts, etc.), and according to a highest-fraction-of-deletes-first algorithm 718, the table which has the most deletes relative to non-delete operations over some time interval may be selected for analysis next.

A number of different criteria 752 may be used in some embodiments to decide whether, with respect to a given group of records of a selected table, a physical delete cleanup operation should be performed. For example, as discussed above in the context of FIG. 6, in some embodiments the number of complete storage blocks 760 that would be eliminated if the delete cleanup operation were to be performed may be considered as a criterion. In other embodiments, instead of or in addition to considering the total number of storage blocks, the total amount of data which would be eliminated 762 (which might correspond to fractions of storage blocks rather than integer counts of storage blocks) may be considered. For example, in one embodiment it may be the case in one example scenario, in which individual storage blocks are each 4 megabytes in size, that the total amount of dirty deleted data that could be eliminated with respect to the group of records being considered is 5 megabytes spread over ten different blocks, but the number of storage blocks needed for the table would not be reduced because of the distribution of the dirty deleted data among the ten blocks. In such a scenario, if the total amount of data which would be eliminated is considered a more important factor than the number of discrete storage blocks that would be eliminated, the physical delete cleanup operation may be approved. In contrast, if at least one storage block has to be eliminated as per a "number of blocks eliminated" criterion 760, the physical delete cleanup operation may not be approved in such an embodiment.

In at least one embodiment, the age of the oldest dirty delete 764 of the record group may be considered among the approval criteria for physical deletes for the record group—e.g., if at least R records of the group were logically deleted at least M minutes ago relative to the time at which the analysis is being performed, a physical delete cleanup may be initiated regardless of the total size of the dirty deleted data. In some embodiments, the rate at which operations of various kinds (e.g., reads) were directed to the record group 766 during some time interval may be taken into consideration when deciding whether a physical delete cleanup operation should be approved. For example, if there have been no queries directed to the record group for P hours, a decision that a delete cleanup operation should not be performed may be taken, e.g., under the assumption that the record group is not very likely to be accessed in the future. In various embodiments, different combinations of the factors, criteria and algorithms shown in FIG. 7 may be used during various phases of delete cleanup-related operations. Other algorithms and factors/criteria not shown in FIG. 7 may be employed in some embodiments.

Figure 8:
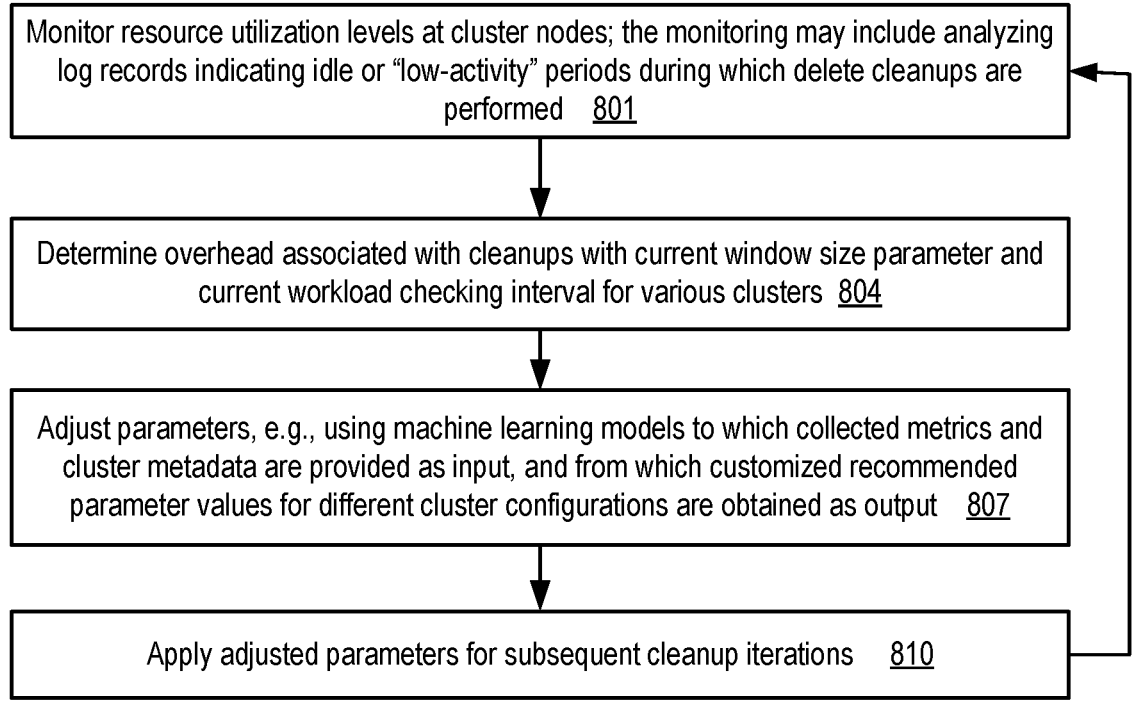
FIG. 8 is a flow diagram illustrating aspects of operations which may be performed to automatically adjust parameter values associated with deletion cleanup operations, according to at least some embodiments.

FIG. 8 is a flow diagram illustrating aspects of operations which may be performed to automatically adjust parameter values associated with deletion cleanup operations, according to at least some embodiments. In one embodiment, the storage service may monitor resource utilization levels at various cluster nodes (element 801), e.g., where the monitoring may include analyzing log records indicating idle or low-activity periods during which delete cleanup operations of the kinds discussed above were performed.

The overhead associated with cleanups performed using a current window size parameter, a current workload checking interval, and various other current parameter settings may be determined in the depicted embodiment (element 804). One or more of the parameters may be adjusted, e.g., to lower overhead for future delete cleanup iterations (element 807) in some embodiments. In at least one embodiment collected metrics and cluster metadata (e.g., cluster size, operation request rates etc.) may be provided as inputs to a machine learning model or an optimization algorithm, and customized recommended parameter values may be obtained from the model or algorithm for various cluster configurations and workload levels. The recommended or adjusted parameter values may be used for some number of subsequent cleanup iterations in the depicted embodiment (element 810).

It is noted that in various embodiments, some of the operations shown in FIG. 5, 6 or 8 may be implemented in a different order than that shown in the figure, or may be performed in parallel rather than sequentially. For example, delete cleanup operations may be performed in parallel at the cluster level, at the table level and/or at the record group level in some embodiments; that is, respective cleanup operations for different record groups, tables or clusters may overlap with one another in time. Additionally, some of the operations shown in FIG. 5, 6 or 8 may not be required in one or more implementations.

Illustrative Computer System

Figure 9:
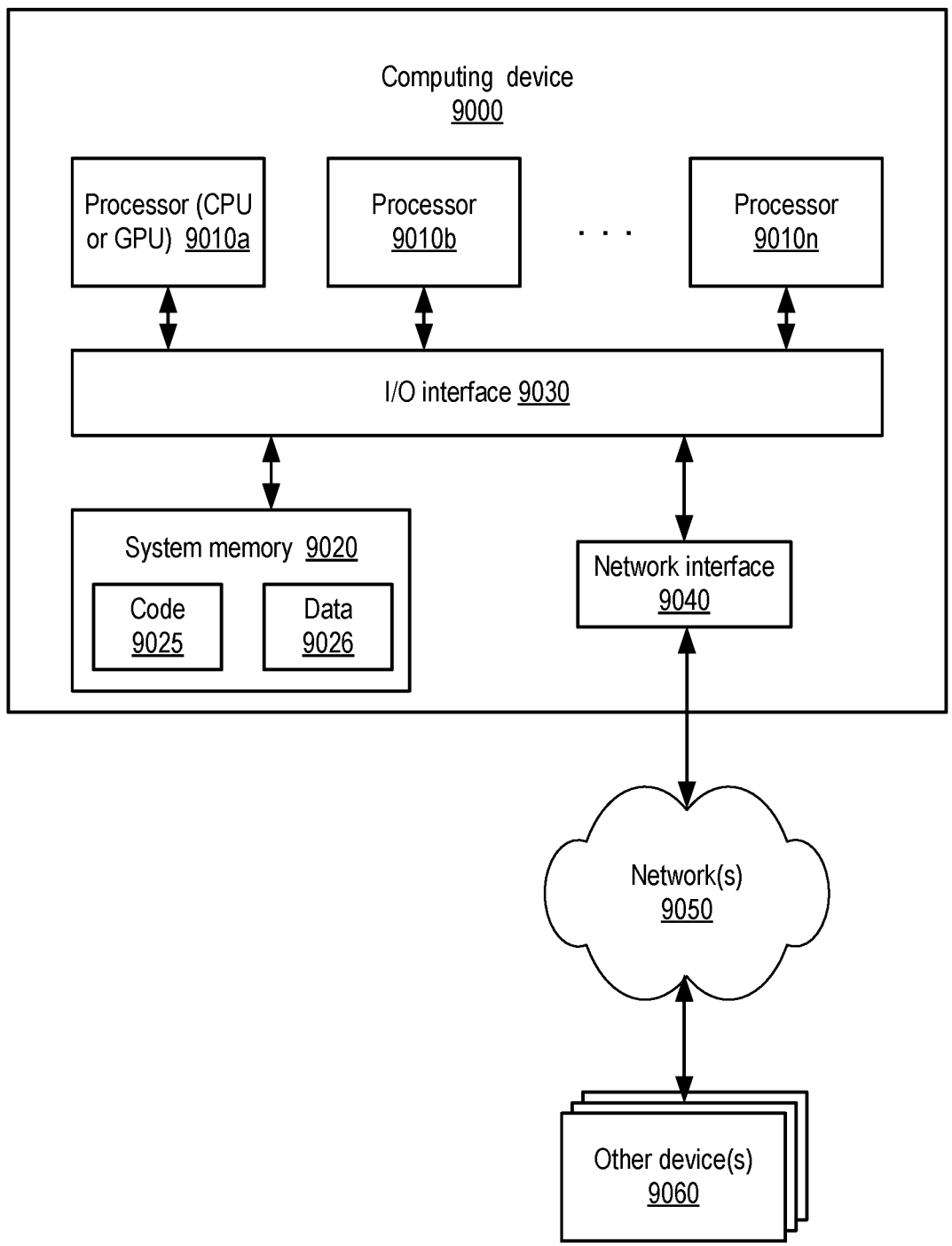
FIG. 9 is a block diagram illustrating an example computing device that may be used in at least some embodiments.

In at least some embodiments, a server that implements one or more of the techniques described above for delete cleanup-related operations as well as other storage-related operations, e.g., at various control-plane or data-plane components of a storage service including cluster nodes, may include a general-purpose computer system that includes or is configured to access one or more computer-accessible media. FIG. 9 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors or CPUs.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 8, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. In various embodiments, the term "computing device" may refer to one or more of these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising: a memory to store program instructions which, if performed by at least one processor, cause the at least one processor to implement a storage service configured to: determine whether a workload of performing client-submitted requests directed to a first collection of data items satisfies a workload condition, the first collection of data items including a first data item comprising one or more records, and in response to determining that the workload satisfies the workload condition: determine whether a metric that describes a cumulative size of one or more records in a first portion of the first data item meets a size condition, wherein individual ones of the one or more records comprise data currently marked for deletion;

and in response to determining that the metric meets the size condition, cause a first cleanup operation directed to a first group of one or more storage blocks at which the first portion of the first data item is stored, wherein the first group of one or more storage blocks comprises the data currently marked for deletion, wherein the first cleanup operation comprises replacing the first group with a second group of one or more storage blocks, wherein the second group excludes the data currently marked for deletion, and wherein a total number of storage blocks of the second group is less than a total number of storage blocks of the first group.

2. The system as recited in claim 1, wherein to determine whether the metric that describes the size of dirty records to which logical delete operations have been directed in the first portion of the first data item satisfies the size condition, the method comprises determine whether removal of one or more of the dirty records would result in a reduction in a number of storage blocks required for the first data item.

3. The system as recited in claim 1, wherein the method further comprises: subsequent to a completion of the first cleanup operation, re-evaluate the workload associated with the first collection of data items;

and use at least a result of the re-evaluation to determine whether to initiate a size cleanup operation directed to a second portion of the first data item.

4. The system as recited in claim 1, wherein to determine whether the metric that describes the size of dirty records to which logical delete operations have been directed in a first portion of the first data item satisfies the size condition, the method comprises examine a first object comprising deletion metadata associated with at least the first portion of the first data item.

5. The system as recited in claim 1, wherein to determine whether the workload satisfies the workload condition, the method comprises steps to at least determine whether an operation requested by a client has been directed to at least one data item of the first collection within a time interval.

6. A method, comprising: determining that a workload of performing client-submitted requests associated with a first collection of data items including a first data item meets a workload threshold, wherein the first data item comprises one or more records;

in response to determining that the workload meets the workload threshold, determining whether a metric that describes a cumulative size of one or more records in a first portion of the first data item satisfies a size condition, wherein individual ones of the one or more records comprise data currently marked for deletion;

and in response to determining that the metric satisfies the size condition, initiating a first cleanup operation to remove at least a portion of the first portion of the first data item such that one or more storage blocks that store the first portion of the first data item exclude data of the portion of the first portion of the first data item currently marked for deletion.

7. The method as recited in claim 6, wherein the first cleanup operation comprises replacing a first group of one or more storage blocks with a second group of one or more storage blocks, wherein the second group are the storage blocks that exclude the portion of the first dirty record;

wherein individual ones of the one or more records comprise respective values of a plurality of columns including a first column and a second column, wherein content of the one or more records is stored in a plurality of chains of storage blocks including a first chain comprising values of the first column and a second chain comprising values of the second column, wherein the first group of one or more storage blocks is part of the first chain, and wherein the second group of one or more storage blocks is part of the first chain.

8. The method of claim 6, wherein the first cleanup operation comprises moving another portion of another record in the first portion of the data item from a first storage block of the storage blocks to a second storage block of the storage blocks.

9. The method as recited in claim 6, wherein determining whether the metric that describes the size of dirty records to which logical delete operations have been directed in the first portion of the first data item satisfies the size condition comprises determining whether removal of one or more of the dirty records would result in a reduction in a number of storage blocks required for the first data item.

10. The method as recited in claim 6, further comprising: after completing the first cleanup operation, re-evaluating the workload associated with the first collection of data items;

And using at least a result of the re-evaluation to determine whether to initiate a second cleanup operation directed to a second portion of the first data item.

11. The method as recited in claim 6, wherein the first collection of data items comprises a plurality of data items, further comprising: in response to determining that the workload satisfies the workload condition, selecting the first data item from the plurality of data items for analysis with respect to dirty records, wherein an algorithm used for said selecting comprises one of: (a) a random selection algorithm, (b) an analysis, with respect to respective data items, of a duration since the data item was last analyzed with respect to removal of dirty records, or (c) an examination of one or more queues.

12. The method as recited in claim 6, wherein the first collection of data items is managed using a plurality of nodes including a leader node and one or more non-leader nodes, wherein said determining whether the workload satisfies the workload condition is performed at one of non-leader nodes, and wherein said replacing the first group with the second group is performed at the one non-leader nodes.

13. The method as recited in claim 6, further comprising: initiating a second cleanup operation directed to a second portion of a second data item, werein the second cleanup operation overlaps in time with the first cleanup operation.

14. The method as recited in claim 6, wherein determining whether the metric that describes the size of dirty records to which logical delete operations have been directed in a first portion of the first data item satisfies the size condition comprises examining a chain of storage blocks comprising deletion metadata entries associated with at least the first portion of the first data item.

15. The method as recited in claim 14, wherein determining whether the metric that describes the size of dirty records to which logical delete operations have been directed in a first portion of the first data item satisfies the size condition comprises using record identifier metadata stored in another chain of storage blocks to access the deletion metadata entries.

16. A non-transitory computer-accessible storage medium storing program instructions that when executed on one or more processors cause the one or more processors to perform a method comprising: determining whether a workload of performing client-submitted requests associated with a first collection of data items including a first data item meets a workload threshold, wherein the first data item comprises one or more records;

in response to determining that the workload of client-submitted requests meets the workload threshold, determining whether a metric that describes a cumulative size of one or more records in a first portion of the first data item satisfies a size condition, wherein individual ones of the one or more records comprise data currently marked for deletion;

and in response to determining that the metric satisfies the size condition, initiating a first cleanup operation to remove at least a portion of the first portion of the first data item such that one or more storage blocks that store the first portion of the first data item exclude data of the portion of the first portion of the first data item currently marked for deletion.

17. The non-transitory computer-accessible storage medium as recited in claim 16, wherein determining whether the metric that describes the size of dirty records to which logical delete operations have been directed in the first portion of the first data item satisfies the size condition comprises determining whether removal of one or more of the dirty records would result in a reduction in a number of storage blocks required for the first data item.

18. The non-transitory computer-accessible storage medium as recited in claim 16, wherein the method further comprises: after completing the first cleanup operation, re-evaluating the workload associated with the first collection of data items;

and using at least a result of the re-evaluation to determine whether to initiate a second cleanup operation directed to a second portion of the first data item.

19. The non-transitory computer-accessible storage medium as recited in claim 16, wherein the method further comprises: in response to determining, after the first cleanup operation is initiated, and prior to completing the first cleanup operation, that the workload associated with the first collection of data items has changed, deferring at least a part of the first cleanup operation.

20. The non-transitory computer-accessible storage medium as recited in claim 16, wherein the method further comprises: causing workload monitoring logs to be generated with respect to one or more collections of data items including the first collection;

and modifying, based at least in part on an analysis of the workload monitoring logs, one or more parameters associated with cleanup operations of the one or more collections, wherein a first parameter of the one or more parameters comprises a duration of an interval between successive workload analysis iterations associated with the workload threshold.

* * * * *